F. H. KNIGHT.
LOCK FOR AUTOMOBILES.
APPLICATION FILED FEB. 5, 1917.
1,223,888.
Patented Apr. 24, 1917.
3 SHEETS—SHEET 1.
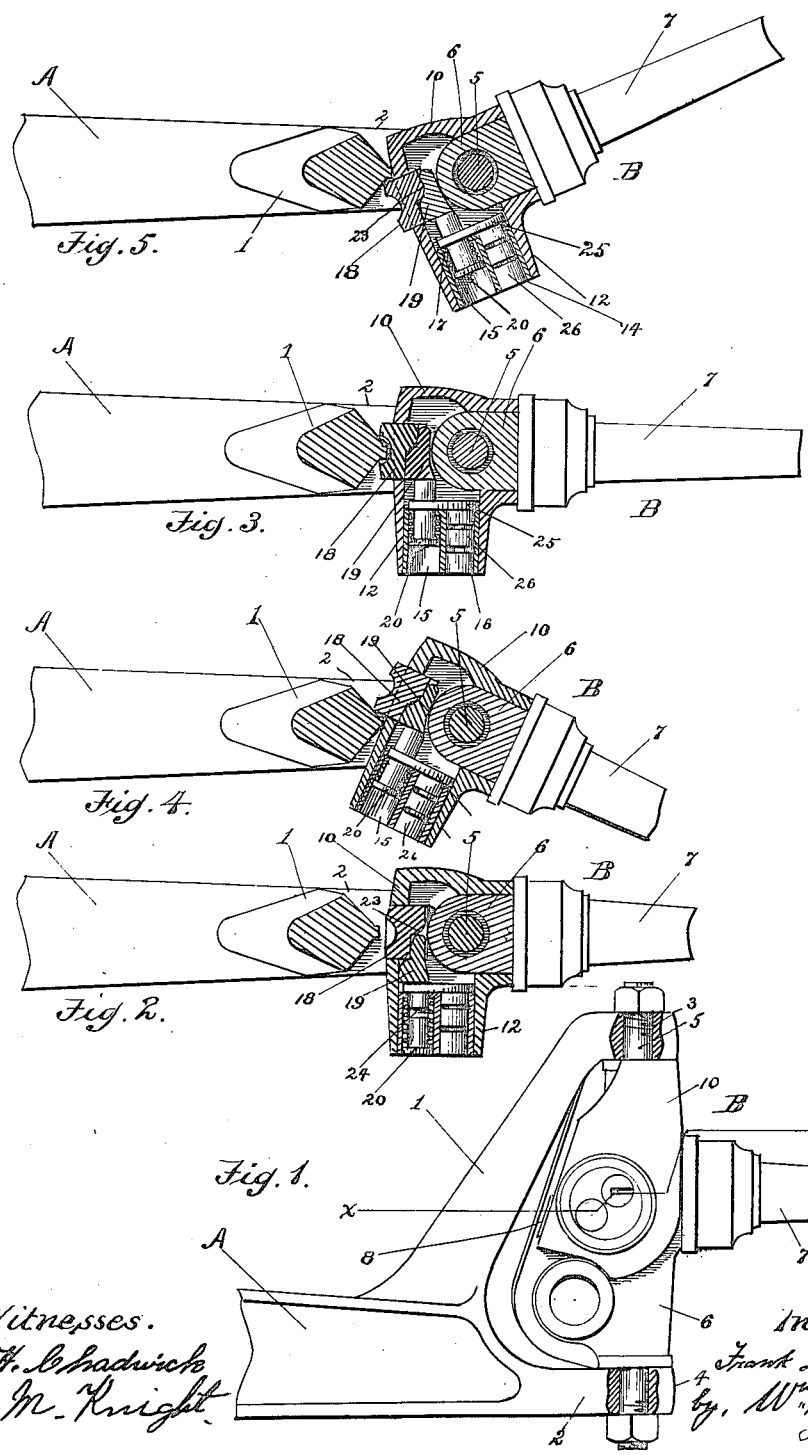

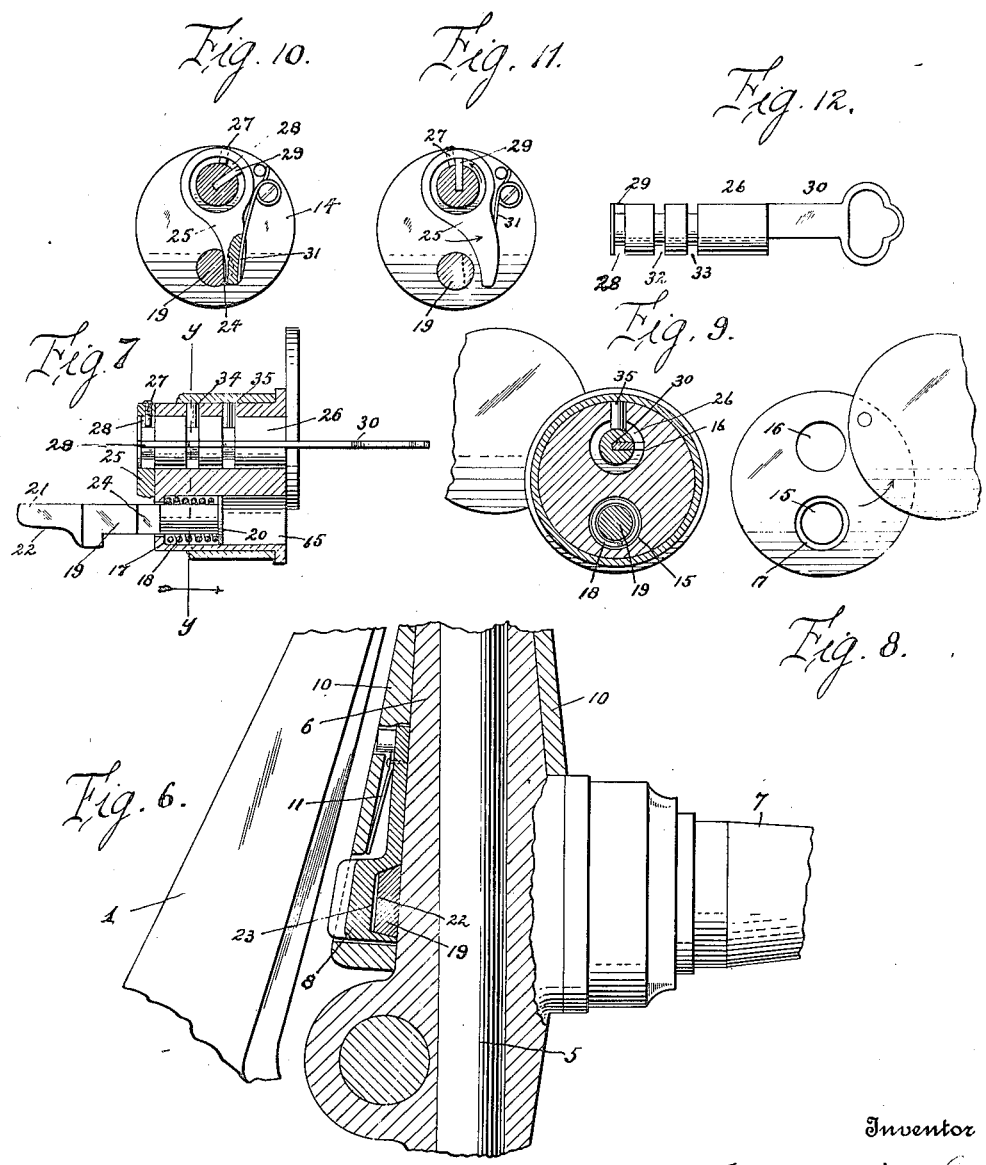

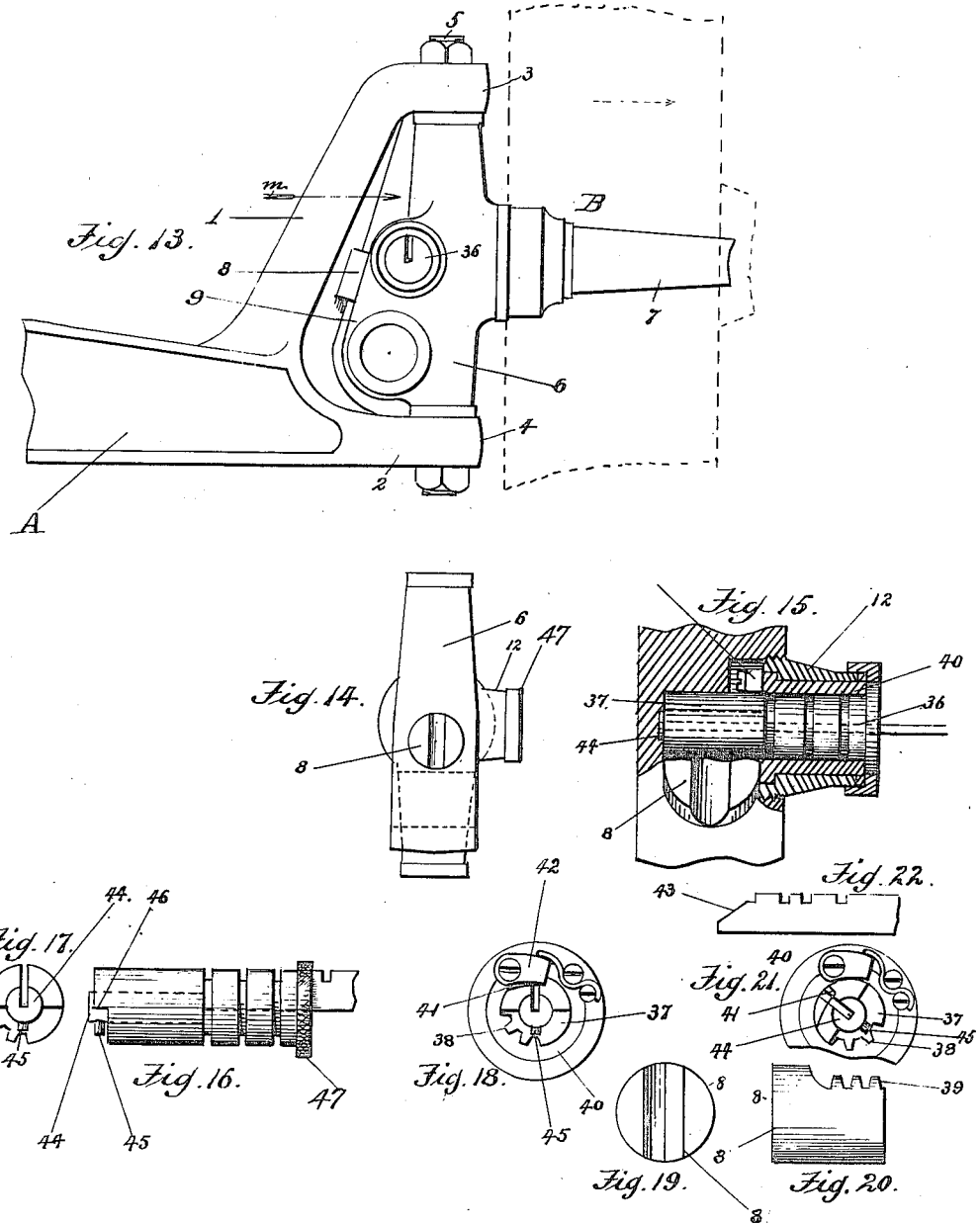

ial axis of the
UNITED STATES PATENT OFFICE.

FRANK H. KNIGHT, OF LANCASTER, PENNSYLVANIA, ASSIGNOR OF ONE-HALF TO HENRY G. RUSH, OF LANCASTER, PENNSYLVANIA.

LOCK FOR AUTOMOBILES.

1,223,888. Specification of Letters Patent. Patented Apr. 24, 1917.

Application filed February 5, 1917. Serial No. 146,697.

*To all whom it may concern:*

Be it known that I, FRANK H. KNIGHT, a citizen of the United States, residing at Lancaster, in the county of Lancaster and State of Pennsylvania, have invented certain new and useful Improvements in Locks for Automobiles, of which the following is a specification.

My invention, while broadly relating to the general class of locking devices, yet more particularly relates to that branch of the class named, which contemplates the provision of devices designed and adapted for the protection from theft, of automobiles, and to such end, my invention has for its object to provide one, or more, if it be desired, of the wheel supporting spindle bodies of an automobile, with a movable locking device arranged to coact with the axle to which the spindle body so provided, is hinged, in positively maintaining said spindle body and its supported wheel, either at an angle to or in alinement with the axis of said axle, whereby, should the vehicle be moved, either by accident or design, it can only be advanced in a direction determined by the angle that the spindle body and its supported wheel, holds with regard to the axle, since the wheel supporting spindle body and axle to which it is hinged being held rigid each with the other as set forth above, renders the steering gear of the automobile powerless to control the movement of the vehicle in any direction.

A further object of my invention, is to provide the wheel supporting spindle body of an automobile with a locking mechanism To the ends outlined above the invention consists in the construction, combination and arrangement of the several parts comprised in such invention substantially as is hereinafter described and illustrated in the accompanying drawings which form a part of this application, and wherein—

Figure 1. illustrates in side elevation, a portion comprising one end of an automobile axle and its connected wheel supporting spindle body, the latter named provided with my improvement, the locking barrier retracted and the spindle body free to turn upon its pivotal bolt.

Fig. 2. is a part top plan, part sectional view of the device shown in Fig. 1, the locking barrier retracted to permit the spindle body to turn upon its pivotal bolt, and showing the spindle in alinement with the axis of the axle.

Fig. 3. is a part top plan, part sectional view of the device, similar to the view shown in Fig. 2, the spindle body shown as in axial alinement with the axle, and the locking barrier projected to maintain the parts in the position named.

Figs. 4 and 5, are each similar to those shown in Figs. 2 and 3, that is to say, part top plan, and part sectional view, and the spindle in each thereof is shown as locked at an angle with the longitudinaxle, the one upon one side and the other upon the opposite side of said axle.

Fig. 6, is an enlarged detail sectional view of the spindle body to more clearly illustrate the construction of the locking barrier, or member, and the relation of said barrier, or member to the end of the axle to which said indicated by the arrow to more clearly show parts of the locking mechanism therein contained.

Figs. 10 and 11, illustrate detail elevations of the inner end of the mechanism containing cylinder shown in Fig. 7, showing different positions of the locking dog hinged to said inner end of the cylinder.

Fig. 12, is a side elevation of the rotatable key receiving stud, which extends through the cylinder shown in Fig. 7, and upon which the locking dogs shown in Figs. 10 and 11 are mounted, and which, in the present view, is shown detached from its bearings and in connection with its operating key.

Fig. 13, illustrates, in side elevation, a modified form of the invention set forth in Fig. 1.

Fig. 14, illustrates an elevation of the spindle body as it appears when removed from its bearings on the axle, and viewed from the side indicated by the arrow m, shown in Fig. 13.

Fig. 15, is an enlarged detail sectional view of the locking mechanism comprised in the spindle body shown in Fig. 14, and the position of said mechanism within said spindle body.

Figs. 16, to 21, inclusive, illustrate detail views of the operative parts of the locking mechanism employed in connection with the spindle body shown in Figs. 13 and 14, and Fig. 22, shows in side elevation, the key used in connection with the locking mechanism shown in Figs. 15 to 21.

Referring to the drawings, wherein similar letters and numerals of reference denote like parts A, designates a portion of an automobile axle, the end of which is bifurcated as shown, to provide arms 1 and 2, which, at their outer ends, extend in parallel planes, and are apertured at 3 and 4, respectively, see Fig. 1, to receive a spindle bolt 5, which extends through said apertured ends of the arms 1 and 2, and through the casing 6, of the spindle body B, which is interposed between said apertured ends, see Figs. 1 and 13.

The axle A and spindle body B, it is to be understood, are of the ordinary well known type and form, the latter named, having its wheel bearing spindle 7, projecting from a point of the spindle casing 6, practically intermediate of the ends thereof, while the arm 1, of the former named, is of greater length than the remaining arm 2, and projects from the upper surface of said axle, as shown.

I provide that the spindle body B, and its supported wheel, shall be positively held either in alinement with the axis of the axle A, as illustrated in Fig. 3, or at an angle thereto upon either side of said axle, as illustrated in Figs. 4 and 5, and to such end, I provide said spindle with a barrier 8, which movable toward and into position to contact with the axle A, as will be presently explained, is normally held within a suitable recess formed therefor, either in a projecting portion 9, formed upon and integral with the spindle casing 6, as shown in Fig. 13, or in a removable shell, or casing 10, which is placed upon such spindle casing 6, as shown in Figs. 1 to 6.

I provide that the barrier 8, shall be maintained in its retracted position, above noted, either through its positive engagement with its actuating device, as is the case in Fig. 13, or by pressure of a spring 11, as is the case in Figs. 1 to 6, see Fig. 6.

I provide that the locking barrier 8, shall be moved outwardly from the spindle body B, and into position to contact with the axle A, to hold said axle and spindle body in locked condition, as hereinbefore described, and to such end, I provide the spindle casing 6, or movable shell 10, thereon, at one side with a projecting portion 12, within which I form a cylindrical chamber for the reception of a removable cylinder 14, which is held in proper position within said cylindrical chamber by a securing pin not shown.

I provide the cylinder 14, with longitudinal apertures 15 and 16, one of which, 15, is at its inner end contracted to form a shoulder 17, to form a bearing for one end of a spiral spring 18, which surrounding the stem of the barrier actuating plunger 19, bears, at its opposite end, against a disk 20, which of like diameter to the aperture 15, is secured to the end of the plunger 19, see Fig. 7.

I provide the inner end of the plunger with a head 21, which, upon the upper and lower surfaces of said plunger, project laterally beyond said surfaces, and which at the forward side of said plunger is cut away, as shown at 22, Fig. 7, to form a cam shaped surface which engages with a like cam shaped surface 23, formed upon the inner face of the barrier 8, see Figs. 3 to 6, and operates when the plunger 19, is pressed inward, to move said barrier outward, and into engagement with the axle A, see Figs. 3, to 5.

It is to be understood that the cam shaped surfaces of the plunger 19, and barrier 8, coact in manner like unto reversed wedges in the operation last above described, to move the barrier outward and maintain it in locking contact with the axle.

I provide that the plunger 19, shall be held in protracted position, during the period of time that the axle and spindle are to be maintained in locked connection, and to such end, I form a recess 24, in the stem of the plunger 19, to be engaged by a dog 25, which is mounted upon the inner end of a key, or locking barrel 26, which is mounted to turn in the cylindrical aperture 16, of the cylinder 14, see Fig. 7.

The locking dog 25, is held in position upon the barrel 26, by a pin 27, which extends into a groove 28, and which also is to be contacted by the inner end 29, of a key 30, when the dog 25, is to be swung from contact with the recess 24, of the plunger 19, see Fig. 11.

A spring 31, operates to maintain the dog 25, in contact with the plunger 19, to force said dog into engagement with the recess 24, in said plunger, when the latter is pressed inward as will be readily apparent.

The spiral spring 18, about the stem of the plunger 19, operates to move said plunger outward, when the dog 25, has been released from the recess 24, in said plunger, and such backward movement of the plunger 19, will in turn release the barrier 8, from outward pressure and permit such barrier to be returned within its recess in the spindle body, by the spring 11, as will be understood.

The key or locking barrel 26, has in the present case, two annular grooves 32 and 33, formed therein, into which pins 34, 35, extend when said barrel is in operative position in the cylinder 14, but said barrel may have any desired number of such grooves 32 33, and pins 34, 35, such number depending upon circumstances.

It will be understood that the key 30, which actuates the barrel 26, is to have as many indents as the barrel 26, has annular grooves.

If desired the barrier actuating mechanism illustrated in Figs. 13 to 22, may be employed instead of that hereinbefore described. In this last noted mechanism I employ a cylindrical key, or locking barrel 36, within the projecting portion 12, of the spindle body 6, and provide said barrel with annular grooves to receive pins, which project thereinto from the walls of the projecting portion 12, of the spindle body, and provide that said barrel shall be operated by a key having its edge provided with indents, all as described in connection with the mechanism illustrated in Figs. 7, to 12, but instead of employing the plunger 19, to move the barrier, as is the case in the mechanism shown in said Figs. 7 to 12, I here employ a short cylinder 37, having upon one of its sides, a series of gear teeth 38, which extend from end, to end, of said cylinder 37, to engage gear teeth 39, which are formed on the barrier, see Fig. 20. I also provide the cylinder 37, at one end, that nearest the removable cylinder 40, within the projecting portion 12,—which cylinder 40, corresponds with the cylinder 14, shown in Figs. 7 to 11—with a locking detent 41, to be engaged, when the barrier is protracted, by a spring pressed pawl 42, that is hinged to the inner end of the cylinder 40, to hold said barrier in protracted position.

The pawl 42, is released from engagement with the detent 41, by an incline 43, formed upon the end of the key blank.

It is to be noted that the cylinder 37, which is provided with the gear teeth 38, is mounted upon a diametrically reduced portion 44, of the cylindrical locking barrel 36, and is held in position thereon, by a pin 45, which passes through the end of such reduced portion and is adapted to contact with a shoulder 46, on the cylinder 37, to turn such cylinder to move its connected barrier 8 outward, when the cylindrical locking barrel 36, is turned by pressure from the hand through the medium of a milled head 47, formed upon its outer end, see Figs. 14 and 16.

It is to be understood that the cylinder 36, is to be turned by pressure from the hand upon its enlarged, and preferably milled head, indicated by 47, Figs. 14 and 16, and that such turning of the cylinder 36, is for the purpose of moving the barrier 8, outward through the engagement of the gear teeth 39, of said barrier, with the teeth 38, on the cylinder 37, which is turned by the cylinder 36, as above described. It is also to be understood that the rotation of the cylinder 36, as above described, is to be continued until the locking detent 41, on the cylinder 37, is engaged by the pawl 42, at which time the barrier 8, will be fully protracted into position for operative engagement with an axle, from which position it is to be released by a key, as has been described above.

The term "spindle body" hereinbefore employed, and to be hereinafter used in the claims, is that by which the entire drop forging,—which in Figs. 1 and 13 is shown as hinged by the bolt 5, between the ends 3 and 4, of the arms 1 and 2, at the end of the axle A,—is known to the art, and of said drop forging, parts thereof have specific designating names, as for instance, that part of said spindle body B, through which the bolt 5,— by which the spindle body is hinged to the axle—extends, and which in the drawings is indicated by the numeral 6, is known to the art as the spindle casing, and that part upon which the wheel is mounted and which is indicated in the drawings by the numeral 7, is known as the spindle, and therefore it is to be understood that the use of the specific term "spindle casing," merely indicates the exact part of the spindle body upon which the locking mechanism hereinbefore described, is located.

It is to be understood that the main or principal elements comprised in my invention, consist essentially in a short movable barrier mounted upon the spindle body preferably within a recess formed therein for such purpose; a device for projecting such barrier beyond the surface of the spindle body, and into position to contact with the end of the axle, when the spindle body and its supported wheel is to be locked from laterally swinging movement upon said axle; and means for holding said barrier projecting device locked against retraction, and the barrier in continuous engagement with the axle until the parts named are to be purposely released therefrom, and to the ends named, it is thought that any means, other than those set forth herein, that will meet and fulfil the conditions outlined will fall within the scope and limit of my invention.

Having thus described my invention, I claim, and desire to secure by Letters Patent:

1. In combination a spindle body to support an automobile wheel said spindle body hinged to swing laterally upon an axle, a barrier movably mounted upon said spindle body to be moved into engagement with the axle to hold said spindle body at a like angle with either desired face of said axle, and a device to move said barrier into such engagement with the axle.

2. In combination a spindle body to support an automobile wheel said spindle body hinged to swing laterally upon an axle, a barrier movably mounted upon said spindle body to be moved into engagement with the axle to positively hold said spindle body at a like angle with either desired face of said axle, a device to move said barrier into engagement with the axle, and means to hold said device in operative engagement with said barrier.

3. In combination a spindle body to swing laterally upon an axle and to support an automobile wheel, a spindle casing forming a part of said spindle body and having an axial aperture to receive a bolt whereby it is hinged to the axle, said bolt, a barrier movably mounted upon the spindle casing to be moved into engagement with the axle to prevent the lateral swinging of the spindle body upon said axle, and a device to be moved to move the barrier outwardly from the spindle casing and into position to engage the axle and to maintain it in such position.

4. A spindle body to support an automobile wheel said spindle body hinged to an axle to swing in opposite directions thereon, a barrier upon said spindle body to be moved to engage an axle, a device to be freely moved by pressure from the hand in one direction to move the barrier outwardly from the spindle body and into engagement with the axle, and means to maintain said device in engagement with the barrier and said barrier in engagement with the axle until said device has by a key been released from restraint.

5. In combination a spindle body to support an automobile wheel and hinged to swing laterally upon an axle, a barrier movably mounted upon said spindle body to be moved into engagement with the axle to hold said spindle body from lateral movement thereon, a device to be freely moved in one direction by pressure from the hand to engage and move the barrier toward and into engagement with the axle, and a key controlled lock to hold said device in engagement with the barrier and said barrier in engagement with the axle until such lock has been acted upon by a key to release said device from restraint and thereby permit the return of said device and its actuated barrier to normal position.

In testimony whereof I hereto affix my signature in presence of two witnesses.

FRANK H. KNIGHT.

Witnesses:
  LOUISE R. LIREZEY,
  JAMES E. HOFFMAN, Jr.